United States Patent
Itoh et al.

(10) Patent No.: US 11,535,183 B2
(45) Date of Patent: Dec. 27, 2022

(54) VEHICLE

(71) Applicants: TOYOTA JIDOSHA KABUSHIKI KAISHA, Aichi (JP); SUBARU CORPORATION, Tokyo (JP)

(72) Inventors: Keisuke Itoh, Nagoya (JP); Ryotaro Fujikawa, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 108 days.

(21) Appl. No.: 17/203,757

(22) Filed: Mar. 17, 2021

(65) Prior Publication Data

US 2021/0316683 A1 Oct. 14, 2021

(30) Foreign Application Priority Data

Apr. 14, 2020 (JP) .............................. JP2020-072314

(51) Int. Cl.
| | | |
|---|---|---|
| *B60J 7/00* | (2006.01) | |
| *B60R 19/34* | (2006.01) | |
| *B62D 21/15* | (2006.01) | |
| *B62D 25/08* | (2006.01) | |
| *B60J 5/10* | (2006.01) | |

(52) U.S. Cl.
CPC .............. *B60R 19/34* (2013.01); *B60J 5/10* (2013.01); *B62D 21/152* (2013.01); *B62D 25/08* (2013.01)

(58) Field of Classification Search
CPC .. B62D 25/081; B62D 25/082; B62D 25/088; B62D 25/087; B62D 21/152; B60R 22/26; B60R 19/18; B60R 19/34; B60R 19/24; B60R 2019/1813
See application file for complete search history.

(56) References Cited

U.S. PATENT DOCUMENTS

| | | | | |
|---|---|---|---|---|
| 5,381,871 A | * | 1/1995 | Ohta ..................... | B62D 21/155 296/187.11 |
| 8,128,150 B2 | * | 3/2012 | Kamiya ................ | B60R 19/023 293/120 |
| 8,744,743 B2 | * | 6/2014 | Kawasaki ............ | H01Q 1/3233 180/69.2 |
| 9,862,420 B2 | * | 1/2018 | Kato ................... | B62D 25/2027 |
| 10,471,995 B2 | * | 11/2019 | Sugawara ............ | B62D 21/155 |
| 2015/0239400 A1 | * | 8/2015 | Tanaka .................. | B62D 25/12 296/37.1 |
| 2016/0121827 A1 | * | 5/2016 | Yabu ....................... | B60R 19/18 293/120 |
| 2019/0009822 A1 | * | 1/2019 | Sugawara ............... | B60R 19/24 |
| 2020/0269922 A1 | * | 8/2020 | Kiyoshita ............ | B62D 25/087 |
| 2021/0300477 A1 | * | 9/2021 | Kubota .................. | B62D 25/08 |

FOREIGN PATENT DOCUMENTS

| | | |
|---|---|---|
| JP | 2011131695 A | 7/2011 |
| JP | 2014125000 A | 7/2014 |
| JP | 2017132314 A | 8/2017 |

\* cited by examiner

*Primary Examiner* — Kiran B Patel (74) *Attorney, Agent, or Firm* — Hauptman Ham, LLP (57) ABSTRACT

A vehicle may include a body including a rear surface defining an opening, a door configured to open and close the opening, and a rear bumper reinforcement fixed to a portion of the body located below the opening via a crash box. The body may include a lower back reinforcement extending in a vehicle widthwise direction along a lower edge of the opening and at least a part of the lower back reinforcement may be located directly above the rear bumper reinforcement in a vehicle height direction.

6 Claims, 7 Drawing Sheets

VEHICLE

CROSS-REFERENCE TO RELATED APPLICATION

This application claims priority to Japanese Patent Application No. 2020-072314, filed on Apr. 14, 2020, the entire contents of which are incorporated herein by reference.

TECHNICAL FIELD

The art disclosed herein relates to a vehicle.

BACKGROUND

Japanese Patent Application Publication No. 2011-131695 describes a vehicle. This vehicle incudes a body having a rear surface defining an opening, a door configured to open and close the opening, and a rear bumper reinforcement fixed to a portion of the body located below the opening via a crash box. The crash box is designed to be subjected to compressive deformation when a collision load is exerted on the rear bumper reinforcement due to a rear-end collision to the vehicle. The collision energy is thereby absorbed and deformation of the body is effectively mitigated.

SUMMARY

However, in a rear-end collision to a vehicle, a colliding object, such as a vehicle coming from behind, may collide hard to a relatively high portion of the vehicle. In this case, a collision load exerted on a rear bumper reinforcement includes a downward component of force, as a result of which a crash box may be subjected to bending deformation. When such deformation occurs in the crash box, an amount of collision energy absorbed by the crash box degreases significantly. As a result, deformation of a body cannot be mitigated sufficiently. The disclosure herein provides art that enables reduction in unintended deformation of a crash box as exemplified above.

The present teachings may provide a vehicle. The vehicle may comprise a body comprising a rear surface defining an opening, a door configured to open and close the opening and, a rear bumper reinforcement fixed to a portion of the body located below the opining via a crash box. The body may comprise a lower back reinforcement extending in a vehicle widthwise direction along a lower edge of the opening, and at least a part of the lower back reinforcement may be located directly above the rear bumper reinforcement in a vehicle height direction. In other words, the lower back reinforcement and the rear bumper reinforcement are arranged such that they partially overlap each other in a planar view of the vehicle. It should be noted that the phrase "directly above" merely limits a direction of the lower back reinforcement relative to the rear bumper reinforcement, and does not limit the distance between the lower back reinforcement and the rear bumper reinforcement.

In the above vehicle, the lower back reinforcement of the body is located above the rear bumper reinforcement. In this configuration, when a rear-end collision occurs to the vehicle, both the lower back reinforcement and the rear bumper reinforcement can receive the collision load. Thus, even when a colliding object, such as a vehicle coming from behind, collides to a relatively high portion of the vehicle, a downward collision load is less likely to be exerted on the rear bumper reinforcement, thereby reducing bending deformation of the crash box.

DETAILED DESCRIPTION

In an embodiment of the art disclosed herein, the lower back reinforcement may have a shape that defines an enclosed cavity extending in a vehicle widthwise direction. Such a configuration enables an increase in the strength (or resistance) of the lower back reinforcement while diminishing a weight increase of the body. The shape of the lower back reinforcement is not limited to the shape defining the enclosed cavity, and the lower back reinforcement may have a groove shape (such as a shape of a channel member) in another embodiment.

In the above embodiment, the lower back reinforcement may comprise a bulkhead that extends in the vehicle widthwise direction (that is, in a longitudinal direction of the lower back reinforcement) in the enclosed cavity. In other words, the lower back reinforcement may have a shape that defines two or more enclosed cavities in the vehicle widthwise direction. Such a configuration enables a further increase in the strength (or resistance) of the lower back reinforcement.

In an embodiment of the art disclosed herein, a lowest portion of the lower back reinforcement may be located forward of the rear bumper reinforcement and be located lower than a highest portion of the rear bumper reinforcement. In such a configuration, the lower back reinforcement is disposed proximate to the rear bumper reinforcement, thus a downward collision load is even less likely to be exerted on the rear bumper reinforcement, thereby reducing bending deformation of the crash box further.

In an embodiment of the art disclosed herein, the body may further comprise a rear side member that extends in a vehicle longitudinal direction. In this case, the crash box may extend rearward from a rear end of the rear side member. In such a configuration, a collision load exerted on the rear bumper reinforcement is transmitted to the rear side member through the crash box. When the collision load is relatively large, not only the crash box but also the rear end of the rear side member is subjected to compressive deformation, thereby absorbing a greater amount of collision energy.

In the above embodiment, a height difference between a highest portion of the rear side member and a lowest portion of the lower back reinforcement may be at most 30 millimeters. In such a configuration, the lower back reinforcement is disposed proximate to the rear side member, thus the rear side member can sufficiently receive a collision load exerted on the lower back reinforcement.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In the disclosure herein, terms such as forward, rearward, and a longitudinal direction respectively refer to forward, rearward, and a longitudinal direction with respect to the vehicle. Similarly, terms such as leftward, rightward, and a widthwise direction respectively refer to leftward, rightward, and a widthwise direction with respect to the vehicle, and terms such as upward, downward, and a height direction respectively refer to upward, downward, and a height direction with respect to the vehicle. For example, when the vehicle is placed on a horizontal surface, the height direction of the vehicle matches a vertical direction. Further, the widthwise direction of the vehicle is a direction parallel to an axle of the vehicle, and the longitudinal direction of the vehicle is a direction parallel to the horizontal surface and perpendicular to the axle of the vehicle.

First Embodiment

Figure 1:
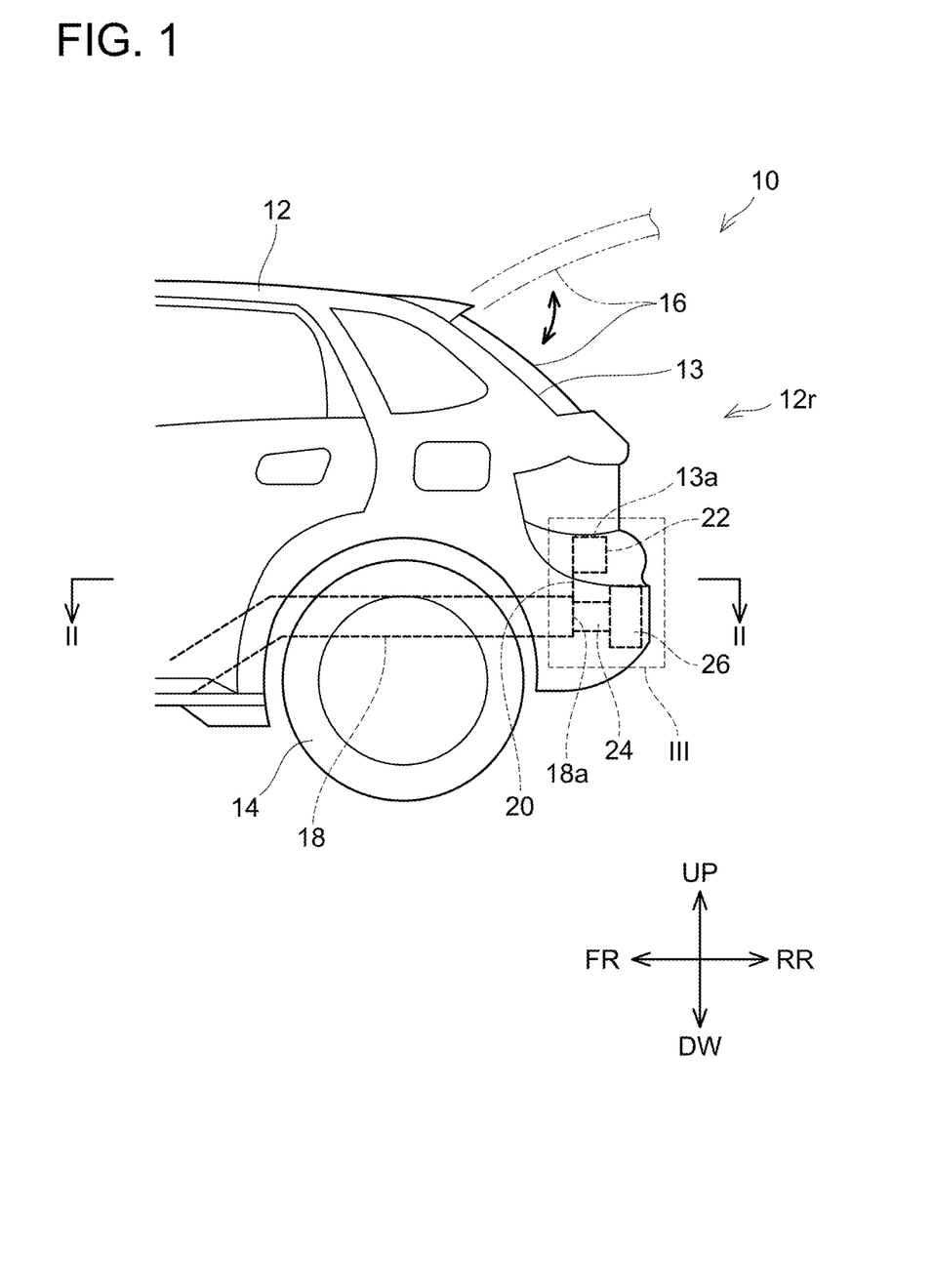
FIG. 1 is a side view schematically showing a rear portion of a vehicle 10 according to a first embodiment.
Figure 2:
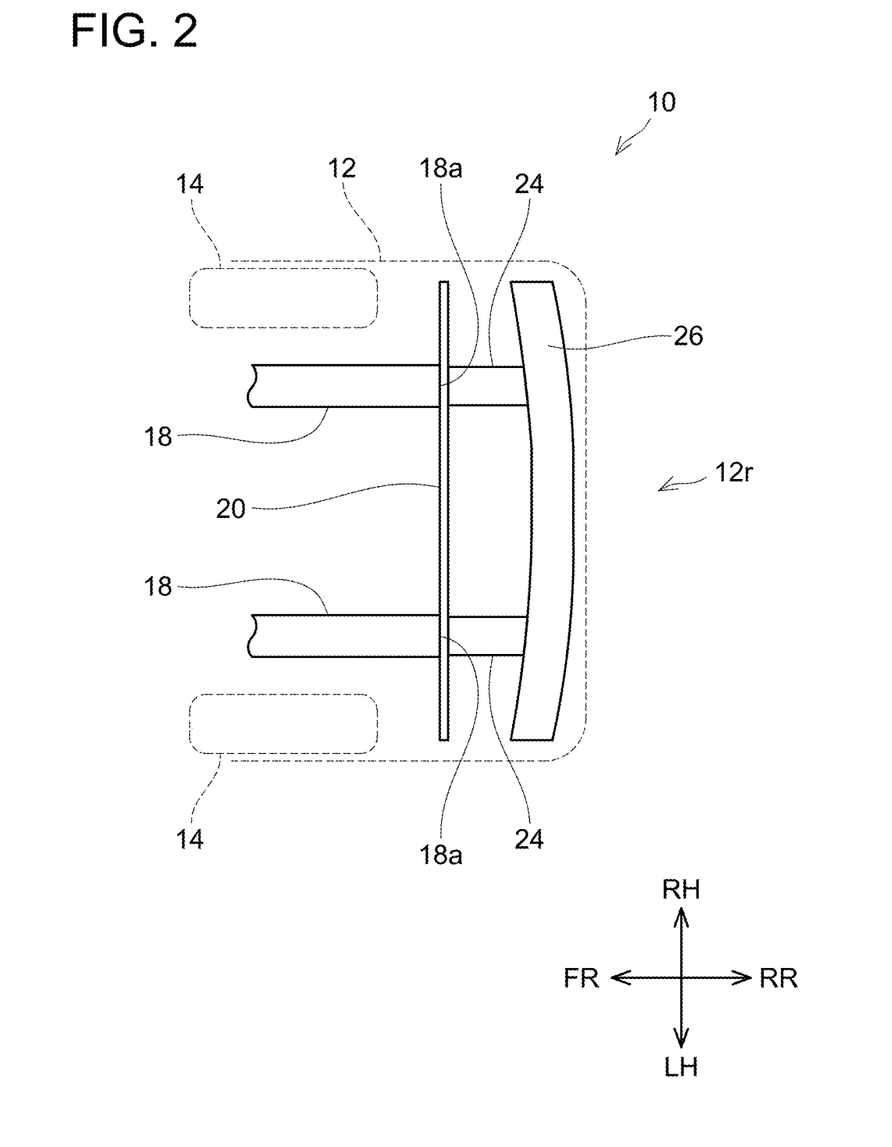
FIG. 2 schematically shows a cross-sectional structure along a line II-II of FIG. 1.
Figure 3:
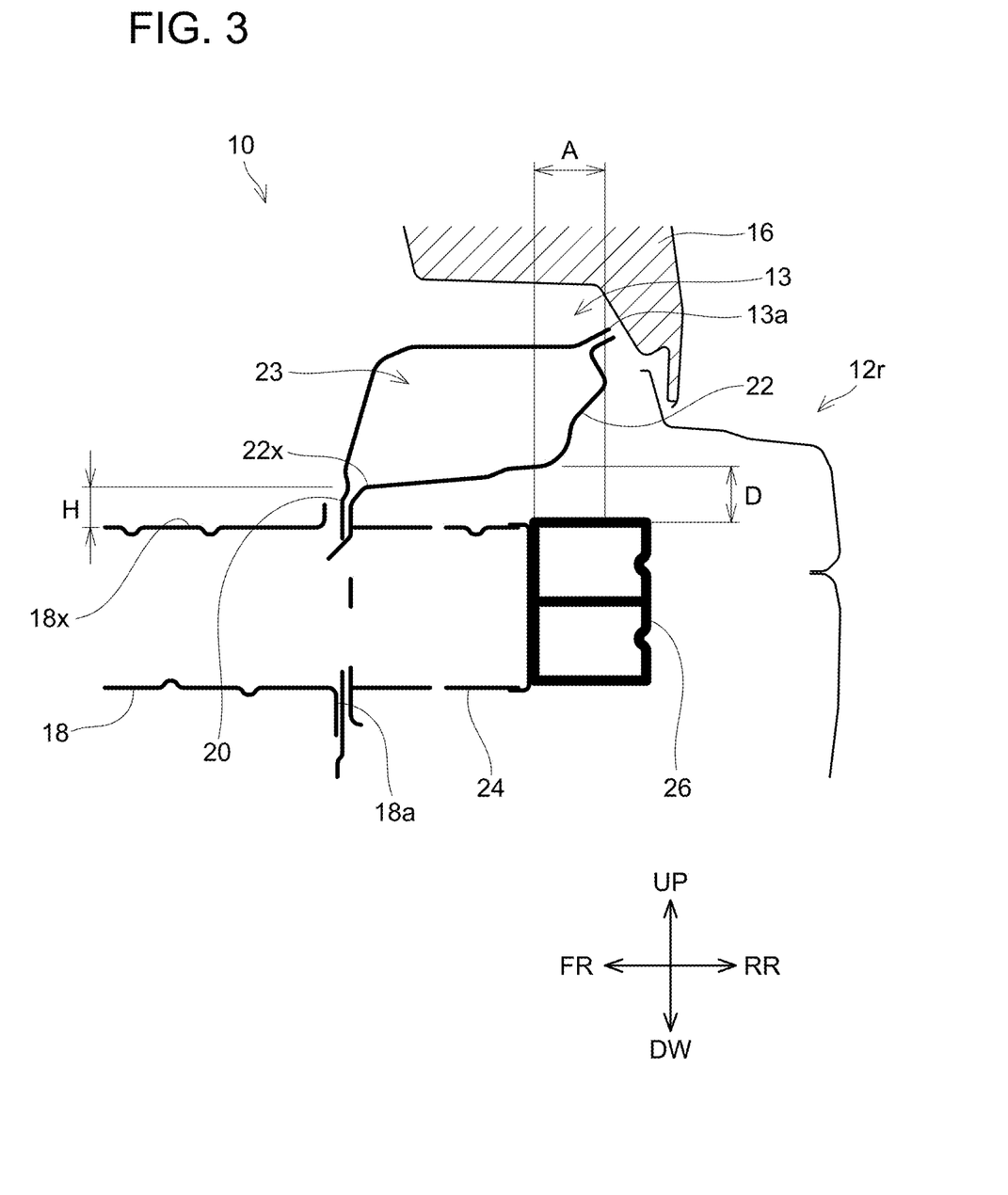
FIG. 3 is a cross-sectional view schematically showing an internal structure in a portion III of FIG. 1.

A vehicle 10 according to a first embodiment will be described with reference to the drawings. As shown in FIGS. 1 to 3, the vehicle 10 according to the present embodiment includes a body 12, a plurality of wheels 14, and a door 16. Although not particularly limited, the body 12 is constituted of metal. The body 12 is of a hatchback type, and a rear opening 13 is defined in a mar surface 12$r$ thereof. The door 16 is supported pivotably by the body 12 and is configured to open and close the rear opening 13. The plurality of wheels 14 includes a pair of rear wheels as shown in the drawings and a pair of front wheels which are not shown in the drawings. The number of the wheels 14 is not limited to four. Further, a direction in which the door 16 pivots is not limited to the height direction, but may be a horizontal direction for example.

Although not particularly limited, the vehicle 10 according to the present embodiment is an electric powered vehicle configured to drive the wheels 14 by a traction motor (not shown). The electric powered vehicle herein includes a rechargeable electric vehicle configured to be charged by an external power source, a hybrid vehicle including both an engine and a traction motor, and a fuel cell vehicle that uses a fuel cell as its power source, for example. The art disclosed herein can be applied not only to an electric powered vehicle but also to an engine vehicle including only an engine as its prime mover.

In the drawings, a direction FR indicates a forward direction of the longitudinal direction of the vehicle 10, and a direction RR indicates a rearward direction of the longitudinal direction of the vehicle 10. Further, a direction LH indicates a leftward direction of the widthwise direction of the vehicle 10, and a direction RH indicates a rightward direction of the widthwise direction of the vehicle 10. Further, a direction UP indicates an upward direction of the height direction of the vehicle 10, and a direction DW indicates a downward direction of the height direction of the vehicle 10. In the following embodiments as well, the frontward direction, the rearward direction, and the longitudinal direction of the vehicle 10 may respectively be termed simply the frontward direction, the rearward direction, and the longitudinal direction; the leftward direction, the rightward direction, and the widthwise direction of the vehicle 10 may respectively be termed simply the leftward direction, the rightward direction, and the widthwise direction; and the upward direction, the downward direction, and the height direction of the vehicle 10 may respectively be termed simply the upward direction, the downward direction, and the height direction.

The body 12 includes a pair of rear side members 18, a back panel 20, and a lower back reinforcement 22. The rear side members 18 are disposed symmetric with respect to the widthwise direction, and each of them extends in the longitudinal direction. The back panel 20 is a panel member that configures the rear surface 12$r$ of the body 12 and is connected to rear ends 18$a$ of the pair of rear side members 18. The back panel 20 extends from the pair of rear side members 18 toward the rear opening 13 and defines a lower edge 13$a$ of the rear opening 13.

The lower back reinforcement 22 is disposed along the back panel 20 and extends in the widthwise direction along the lower edge 13$a$ of the rear opening 13. The lower back reinforcement 22 is a member for increasing the strength (or resistance) of the back panel 20 and has a shape that, together with the back panel 20, forms a tubular member defining an enclosed cavity 23 along the widthwise direction. Such a configuration enables an increase in the strength (or resistance) of the lower back reinforcement 22 while diminishing a weight increase in the body 12. The shape of the lower back reinforcement 22 is not limited to the shape that defines the enclosed cavity 23, and the shape may, for example, be a groove shape (such as a shape of a channel member) in another embodiment.

The vehicle 10 further includes a pair of crash boxes 24 and a rear bumper reinforcement 26. The rear bumper reinforcement 26 is located below the rear opening 13 and extends in the widthwise direction. The rear bumper reinforcement 26 is fixed to a portion of the body 12 that is located blow the rear opening 13 via the pair of crash boxes 24. Each of the crash boxes 24 is a member for absorbing collision energy of a rear-end collision and is designed to be subjected to compressive deformation in a predetermined manner when a collision load is exerted thereon. Although not particularly limited, in the vehicle 10 according to the present embodiment, each of the crash boxes 24 is connected to the rear end 18a of the corresponding one of the rear side members 18 and extends rearward from the rear end 18a.

Figure 4:
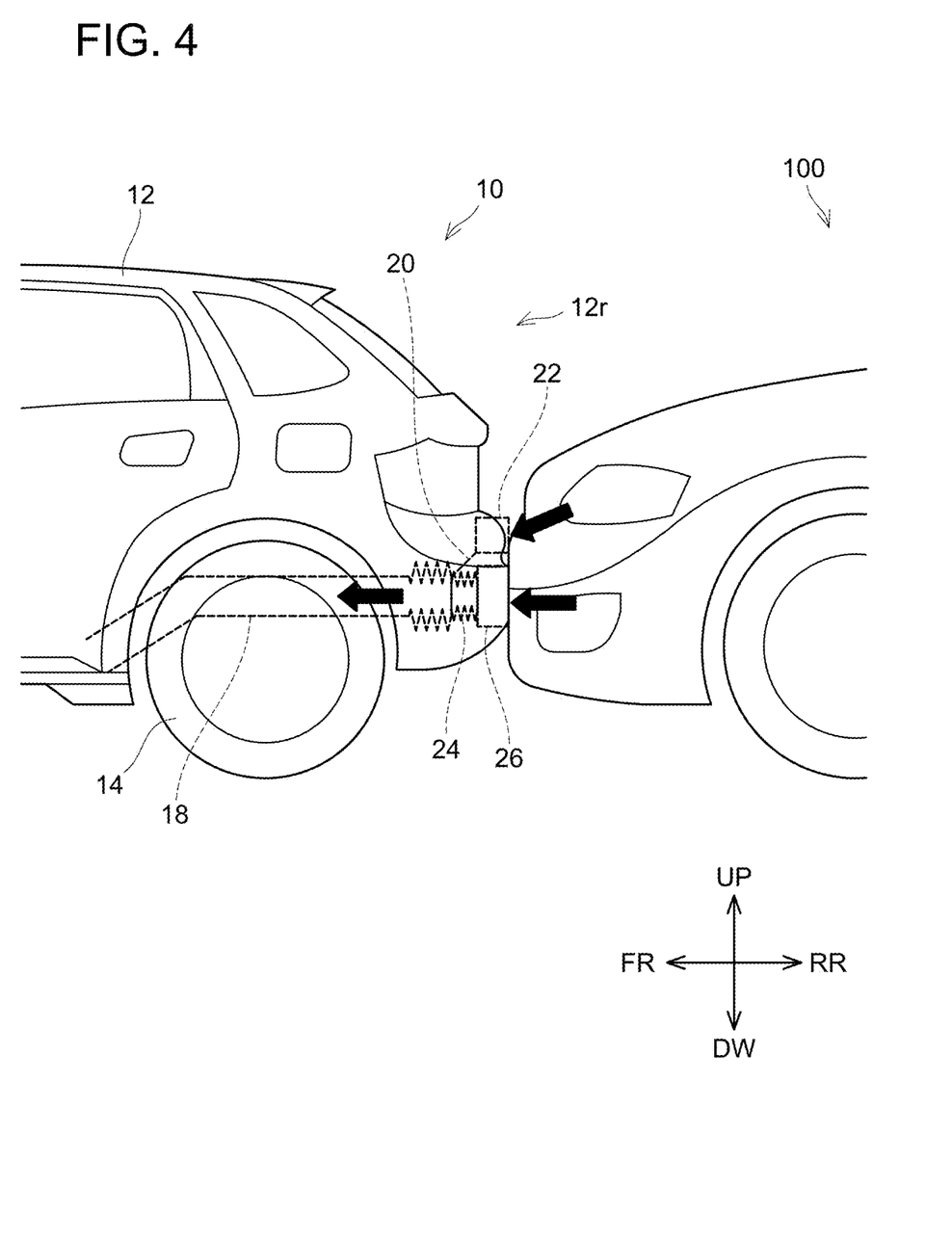
FIG. 4 schematically shows a rear-end collision to the vehicle 10.

As clearly shown in FIG. 3, at least a part of the lower back reinforcement 22 is located directly above the rear bumper reinforcement 26 in the height direction (see a range A in FIG. 3). In other words, in a planar view of the vehicle 10, the lower back reinforcement 22 and the rear bumper reinforcement 26 are arranged such that they at least partially overlap each other. In such a configuration, when a rear-end collision occurs to the vehicle 10 as shown in FIG. 4, both the lower back reinforcement 22 and the rear bumper reinforcement 26 can receive the collision load. Thus, even when a colliding object, such as a vehicle 100 coming from behind, collides to a relatively high portion of the vehicle 10, a downward collision load is less likely to be exerted on the rear bumper reinforcement 26, thereby reducing bending deformation of the crash boxes 24.

Especially in the vehicle 10 according to the present embodiment, the lower back reinforcement 22 is disposed proximate to the rear bumper reinforcement 26. Specifically, a minimum distance D between the lower back reinforcement 22 and the rear bumper reinforcement 26 in the height direction is smaller than a size of the lower back reinforcement 22 in the height direction and a size of the rear bumper reinforcement 26 in the height direction. Such a configuration in which the lower back reinforcement 22 is disposed proximate to the rear bumper reinforcement 26 can more effectively reduce exertion of a downward collision load on the rear bumper reinforcement 26.

In the vehicle 10 according to the present embodiment, as described, each of the crash boxes 24 is connected to the rear end 18a of the corresponding one of the rear side members 18 and extends rearward from the rear end 18a. In such a configuration, a collision load exerted on the rear bumper reinforcement 26 is transmitted to the pair of rear side members 18 through the pair of crash boxes 24. When the collision load is relatively large, rear end portions of the rear side members 18 as well as the crash boxes 24 are subjected to compressive deformation, thereby absorbing a greater amount of the collision energy.

In addition, in the vehicle 10 according to the present embodiment, the lower back reinforcement 22 is connected to the rear ends 18a of the pair of rear side members 18 via the back panel 20. In such a configuration, a collision load exerted on the lower back reinforcement 22 is also transmitted to the pair of rear side members 18 through the back panel 20. As such, the collision energy inputted to the lower back reinforcement 22 can also be absorbed by the rear end portions of the rear side members 18 being subjected to compressive deformation.

In the vehicle 10 according to the present embodiment, a height difference H between a highest portion 18x of each of the rear side members 18 and a lowest portion 22x of the lower back reinforcement 22 is designed to be 10 millimeters. In such a configuration, the lower back reinforcement 22 is disposed proximate to the rear side members 18, thus the rear side members 18 can sufficiently receive a collision load exerted on the lower back reinforcement 22. The aforementioned height difference H is not limited to 10 millimeters, and may, for example, be 30 mm at most, and more preferably 20 mm at most.

Second Embodiment

Figure 5:
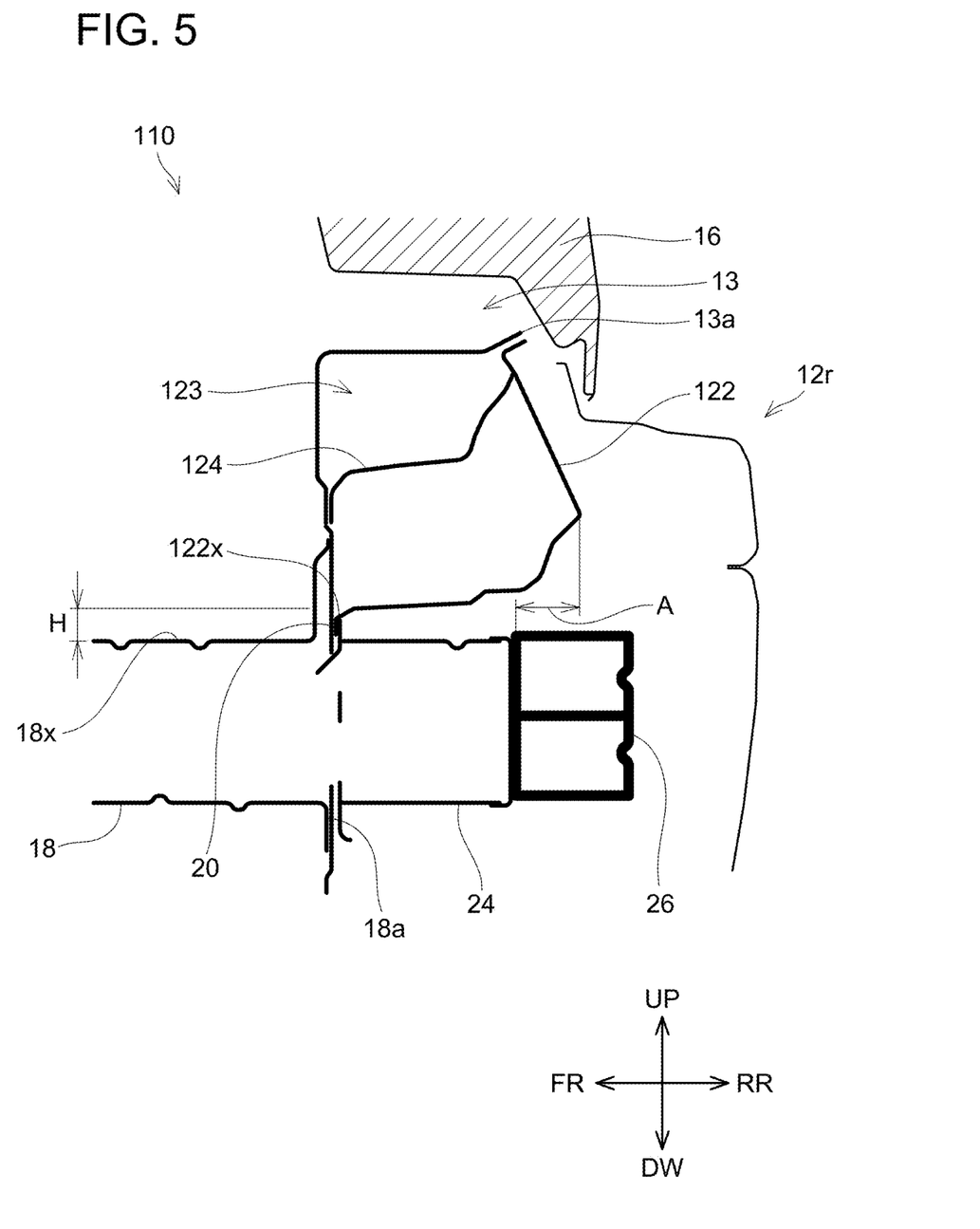
FIG. 5 is a cross-sectional view schematically showing a primary structure of a vehicle 110 according to a second embodiment.

A vehicle 110 according to a second embodiment will be described with reference to FIG. 5. The configuration of a lower back reinforcement 122 of the vehicle 110 according to the present embodiment is different from the configuration of the lower back reinforcement 22 of the vehicle 10 according to the first embodiment. Hereinbelow, differences from the first embodiment will be mainly explained, and the same reference signs are given to configurations that are the same as or corresponding to those of the first embodiment and descriptions thereof will be omitted. FIG. 5 is a cross-sectional view corresponding to FIG. 3 of the first embodiment.

As shown in FIG. 5, the lower back reinforcement 122 according to the second embodiment includes a bulkhead 124 inside its enclosed cavity 123. The bulkhead 124 extends in the widthwise direction (that is, in a longitudinal direction of the lower back reinforcement 122) and at least partially divides the enclosed cavity 123 into two. Such a configuration enables a further increase in the strength (or resistance) of the lower back reinforcement 122. A structure having such a bulkhead 124 is especially advantageous when a cross-sectional area of the lower back reinforcement 122, that is, a cross-sectional area of the enclosed cavity 123 is large, and two or more bulkheads 124 may be provided based on the cross-sectional area of the enclosed cavity 123.

In the vehicle 110 according to the second embodiment as well, at least a part of the lower back reinforcement 122 is located directly above the rear bumper reinforcement 26 in the height direction. Further, the lower back reinforcement 122 is connected to the rear ends 18a of the pair of rear side members 18 via the back panel 20. Further, a height difference H between the highest portion 18x of each of the pair of rear side members 18 and a lowest portion 122x of the lower back reinforcement 122 is designed to be 30 millimeters at most (for example, 10 millimeters). As described above, the lower back reinforcement 122 according to the second embodiment has major features of the lower back reinforcement 22 according to the first embodiment, and thus similarly can reduce the bending deformation of the crash boxes 24.

Third Embodiment

Figure 6:
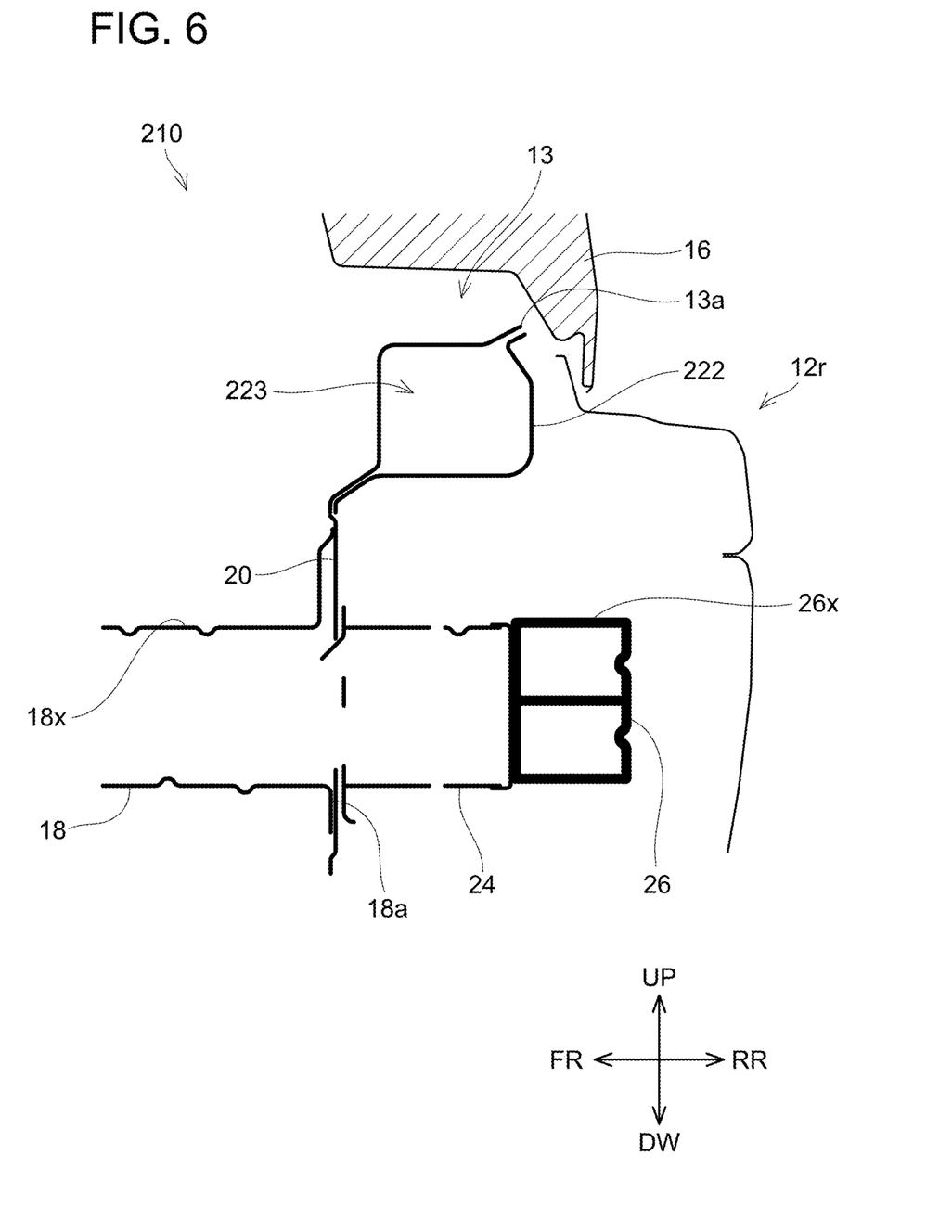
FIG. 6 is a cross-sectional view schematically showing a primary structure of a vehicle 210 according to a third embodiment at a position where a rear side member 18 is located.
Figure 7:
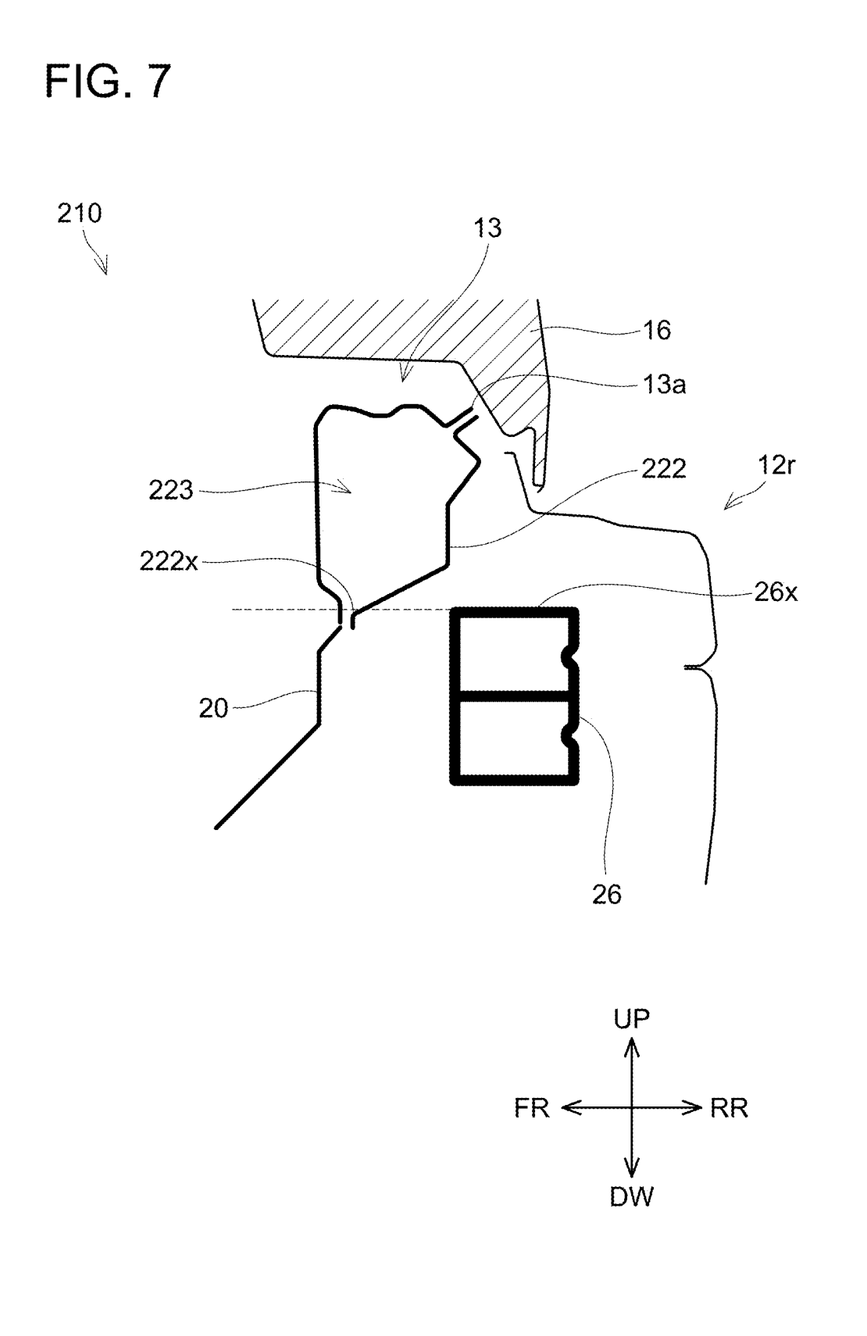
FIG. 7 is a cross-sectional view schematically showing the primary structure of the vehicle 210 according to the third embodiment at a center position in a vehicle widthwise direction.

A vehicle 210 according to a third embodiment will be described with reference to FIGS. 6 and 7. The configuration of a lower back reinforcement 222 of the vehicle 210 according to the present embodiment is different from the configuration of the lower back reinforcement 22 of the vehicle 10 according to the first embodiment. Hereinbelow, differences from the first embodiment will be explained mainly, and the same reference signs are given to configurations that are the same as or corresponding to those of the first embodiment and descriptions thereof will be omitted. FIG. 6 is a cross-sectional view corresponding to FIG. 3 of the first embodiment. FIG. 7 is a cross-sectional view parallel to the one shown in FIG. 6, and shows a cross section at a center of the vehicle 210 in the widthwise direction.

As shown in FIGS. 6 and 7, the lower back reinforcement 222 according to the third embodiment has a shape of which height changes along the widthwise direction, and the height is the lowest at the center of the vehicle 210 in the widthwise direction. Further, at the center of the vehicle 210 in the widthwise direction (that is, in FIG. 7), a lowest portion 222x of the lower back reinforcement 222 is located forward of the rear bumper reinforcement 26 and below the highest portion 26x of the rear bumper reinforcement 26. In such a configuration, the lower back reinforcement 222 is disposed proximate to the rear bumper reinforcement 26, thus a downward collision load is even less likely to be exerted on the rear bumper reinforcement 26 and the bending deformation of the crash boxes 24 can thereby further be reduced.

In the vehicle 210 according to the third embodiment as well, at least a part of the lower back reinforcement 222 is located directly above the rear bumper reinforcement 26 in the height direction. Further, the lower back reinforcement 222 has a shape that defines an enclosed cavity 223 and is connected to the rear ends 18a of the pair of rear side members 18 via the back panel 20. As described above, the lower back reinforcement 222 according to the third embodiment also has the major features of the lower back reinforcement 22 according to the first embodiment and similarly can reduce the bending deformation of the crash boxes 24.

What is claimed is:

1. A vehicle comprising:
    a body comprising a rear surface defining an opening;
    a door configured to open and close the opening; and
    a rear bumper reinforcement fixed to a portion of the body located below the opening via a crash box,
    wherein
    the body comprises a lower back reinforcement extending in a vehicle widthwise direction along a lower edge of the opening, and
    at least a part of the lower back reinforcement is located directly above the rear bumper reinforcement in a vehicle height direction.

2. The vehicle according to claim 1, wherein the lower back reinforcement has a shape that defines an enclosed cavity extending in the vehicle widthwise direction.

3. The vehicle according to claim 2, wherein the lower back reinforcement comprises a bulkhead that extends in the vehicle widthwise direction in the enclosed cavity.

4. The vehicle according to claim 1, wherein a lowest portion of the lower back reinforcement is located forward of the rear bumper reinforcement and is located lower than a highest portion of the rear bumper reinforcement.

5. The vehicle according to claim 1, wherein
    the body further comprises a rear side member that extends in a vehicle longitudinal direction, and
    the crash box extends rearward from a rear end of the rear side member.

6. The vehicle according to claim 5, wherein a height difference between a highest portion of the rear side member and a lowest portion of the lower back reinforcement is at most 30 millimeters.

* * * * *